(12) United States Patent
Mukerji et al.

(10) Patent No.: US 8,752,103 B2
(45) Date of Patent: *Jun. 10, 2014

(54) PERSONAL TELEVISION CHANNEL AND SYSTEM AND METHOD THEREOF

(75) Inventors: Ankur Mukerji, Austin, TX (US); Charles V. Scott, Austin, TX (US); Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 548 days.

This patent is subject to a terminal disclaimer.

(21) Appl. No.: 11/972,478

(22) Filed: Jan. 10, 2008

(65) Prior Publication Data
US 2009/0183213 A1 Jul. 16, 2009

(51) Int. Cl.
*H04N 7/173* (2011.01)

(52) U.S. Cl.
USPC .................. 725/95; 725/86; 725/100

(58) Field of Classification Search
CPC .......................... H04N 21/482; H04N 21/2668
USPC .............................................. 725/95, 100, 86
See application file for complete search history.

(56) References Cited

U.S. PATENT DOCUMENTS

| | | | |
|---|---|---|---|
| 5,758,259 A * | 5/1998 | Lawler | 725/45 |
| 6,249,320 B1 * | 6/2001 | Schneidewend et al. | 348/569 |
| 6,774,926 B1 * | 8/2004 | Ellis et al. | 348/14.01 |
| 7,146,627 B1 * | 12/2006 | Ismail et al. | 725/47 |
| 2002/0056119 A1 * | 5/2002 | Moynihan | 725/87 |
| 2003/0066077 A1 * | 4/2003 | Gutta et al. | 725/34 |
| 2003/0115585 A1 * | 6/2003 | Barsness et al. | 725/9 |
| 2004/0117822 A1 | 6/2004 | Karaoguz et al. | |
| 2004/0128693 A1 * | 7/2004 | Weigand | 725/95 |
| 2004/0163127 A1 * | 8/2004 | Karaoguz et al. | 725/120 |
| 2005/0047752 A1 * | 3/2005 | Wood et al. | 386/83 |
| 2005/0108770 A1 * | 5/2005 | Karaoguz et al. | 725/131 |
| 2005/0239445 A1 * | 10/2005 | Karaoguz et al. | 455/414.1 |
| 2006/0123455 A1 * | 6/2006 | Pai et al. | 725/133 |
| 2007/0199019 A1 * | 8/2007 | Angiolillo et al. | 725/39 |
| 2008/0235731 A1 * | 9/2008 | Bryant et al. | 725/44 |

OTHER PUBLICATIONS

Youtube.com, "YouTube—Broadcast Yourself", 2 pages, www.youtube.com, website last visited Dec. 20, 2007.

* cited by examiner

*Primary Examiner* — Hunter B Lonsberry
*Assistant Examiner* — Alexander Q Huerta
(74) *Attorney, Agent, or Firm* — Guntin & Gust, PLC; Jay H. Anderson

(57) ABSTRACT

A system that incorporates teachings of the present disclosure may include, for example, a media processor having a controller to transmit to a media source a request to access media content of a personal television (TV) channel composed by a subscriber of a media communication system, transmit to the media source a communication identifier, and receive from the media source media content in the personal TV channel adapted according to the communication identifier. Other embodiments are disclosed.

19 Claims, 7 Drawing Sheets

200

400

500

PERSONAL TELEVISION CHANNEL AND SYSTEM AND METHOD THEREOF

FIELD OF THE DISCLOSURE

The present disclosure relates generally to media content presentation techniques and more specifically to a personal television channel and system and method thereof.

BACKGROUND

Social networking has become very popular on the Internet. Common socialization techniques include blogging, and posting personal information on social networks such as YouTube.com™, MySpace.com™ and Facebook.com™ Social networking can also be extended to media communication systems such Internet Protocol television (IPTV), cable TV, or satellite TV capable of providing broadcast and peer-to-peer personal TV channels.

DETAILED DESCRIPTION

In one embodiment of the present disclosure, a computer-readable storage medium can have computer instructions for arranging an assortment of media content for a personal television (TV) channel according to a plurality of communication identifiers, receiving a request for access to the personal TV channel, identifying a communication identifier associated with the request, detecting a match between the identified communication identifier and one among the plurality of communication identifiers, selecting at least a portion of the assortment of media content according to the matched communication identifier, and presenting the selected media content in the personal TV channel for presentation at a requesting device associated with the matched communication identifier.

In another embodiment of the present disclosure, a media processor can have a controller to transmit to a media source a request to access media content of a personal TV channel composed by a subscriber of a media communication system, transmit to the media source a communication identifier, and receive from the media source media content in the personal TV channel adapted according to the communication identifier.

In yet another embodiment of the present disclosure, a method can involve a service provider of a media communication system assigning a subscriber a personal TV channel for presenting media content in the personal TV channel that is adapted according to an identification of a consumer accessing the personal TV channel.

Figure 1:
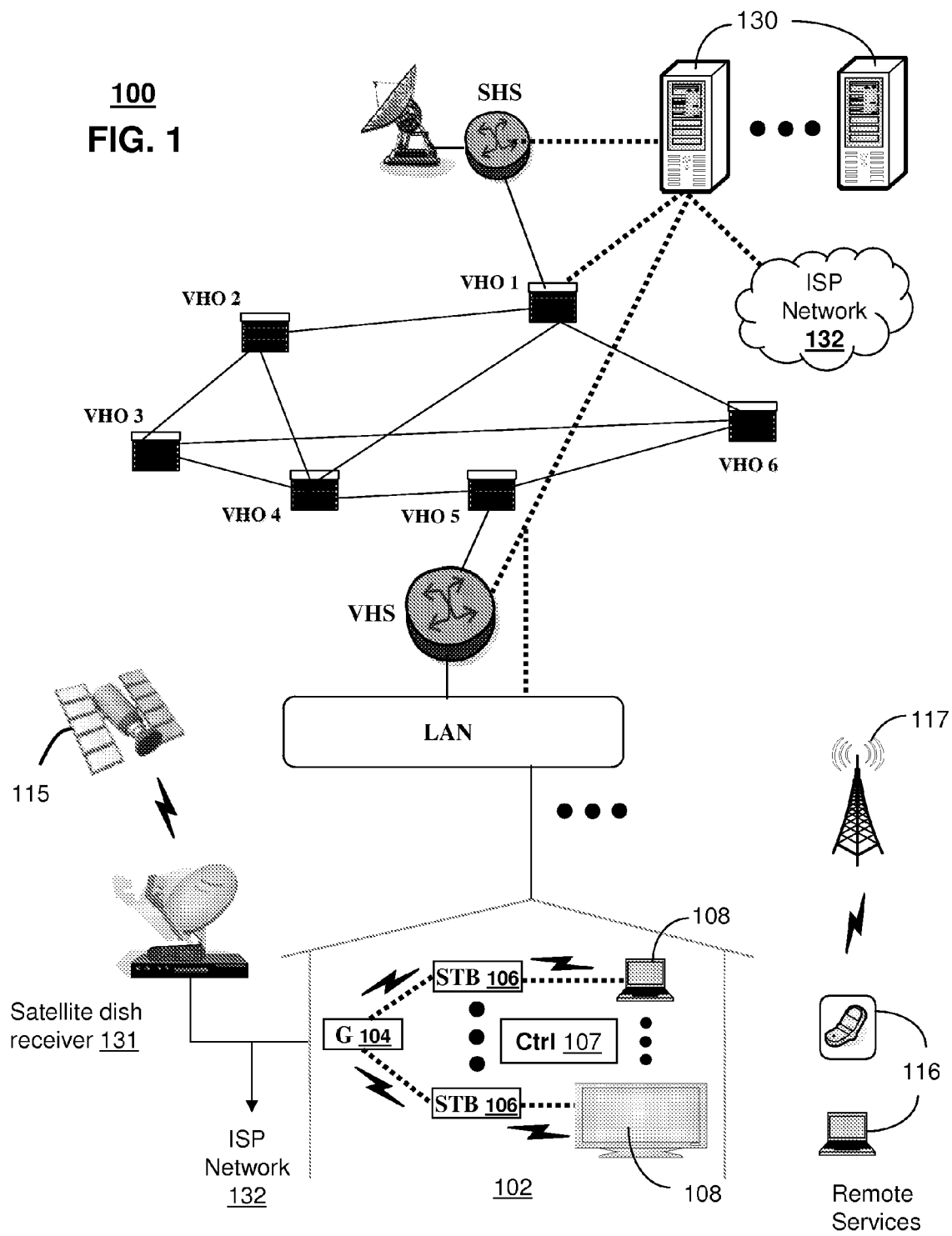
FIGS. 1-4 depict exemplary embodiments of communication systems that provide media services.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). Another distinct portion of the one or more computing devices 130 can be used as a personal television (TV) system (herein referred to as personal TV system 130) for purchasing and constructing personal TV channels purchased by subscribers for distributing media content of the subscriber. In another illustrative embodiment, the media processor 106 of a subscriber of the first communication system 100 can be used as a media source for broadcasting media content in a personal TV channel. The personal TV system 130 can provide personal TV services to subscribers who for example cannot afford a media processor 106 capable of providing such personal TV channel services.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
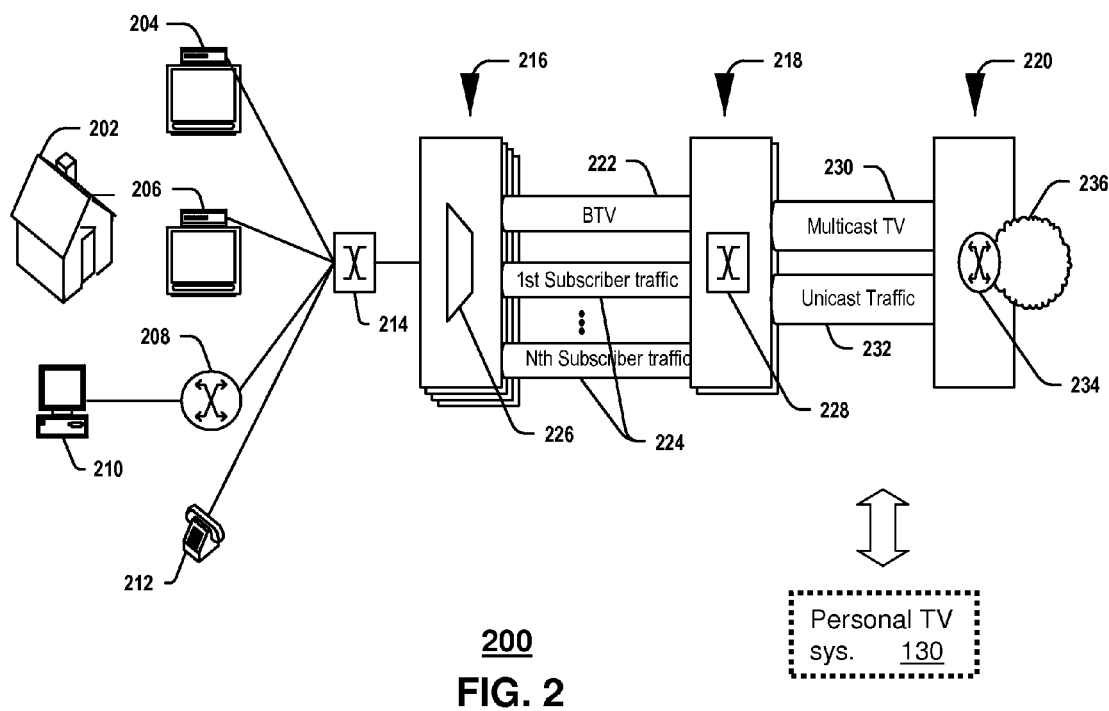

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The personal TV system 130 of FIG. 1 can be operably coupled to the second communication system 200 for purposes of broadcasting media content supplied by subscribers in a personal TV channel of the second communication system. In another illustrative embodiment, the STBs 204, 206 of the second communication system 200 can be used as a media source for broadcasting media content in the personal TV channel of the subscriber.

Figure 3:
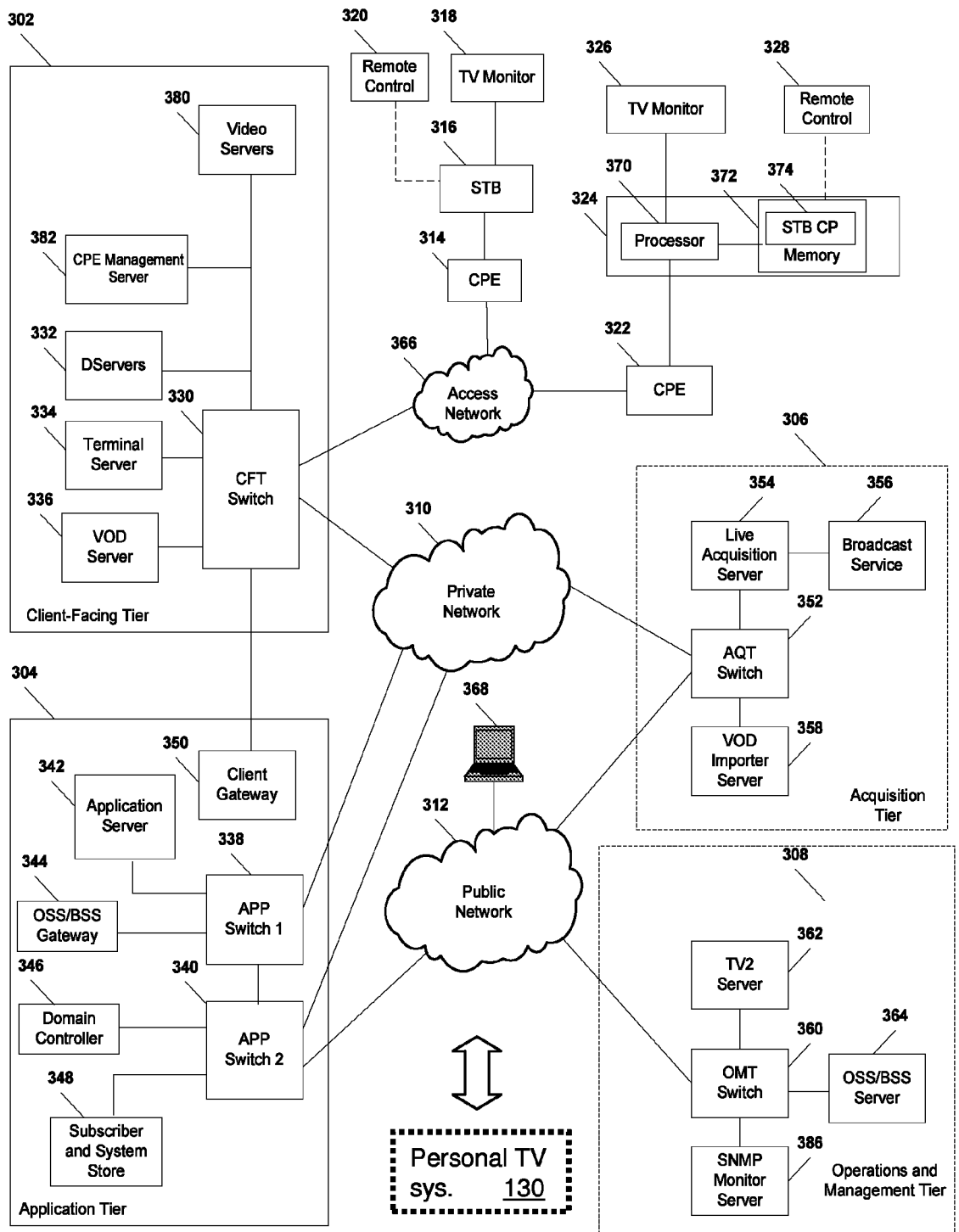

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330.

The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The personal TV system 130 of FIGS. 1-2 can be operably coupled to the third communication system 300 for purposes of broadcasting media content supplied by subscribers in a personal TV channel of the second communication system. In another illustrative embodiment, the STBs 316, 324 of the third communication system 300 can be used as a media source for broadcasting media content in the personal TV channel of the subscriber.

It should be apparent to one of ordinary skill in the art from the foregoing media system embodiments that other suitable media systems for distributing broadcast media content as well as peer-to-peer exchange of content in personal TV channels can be applied to the present disclosure.

Figure 4:
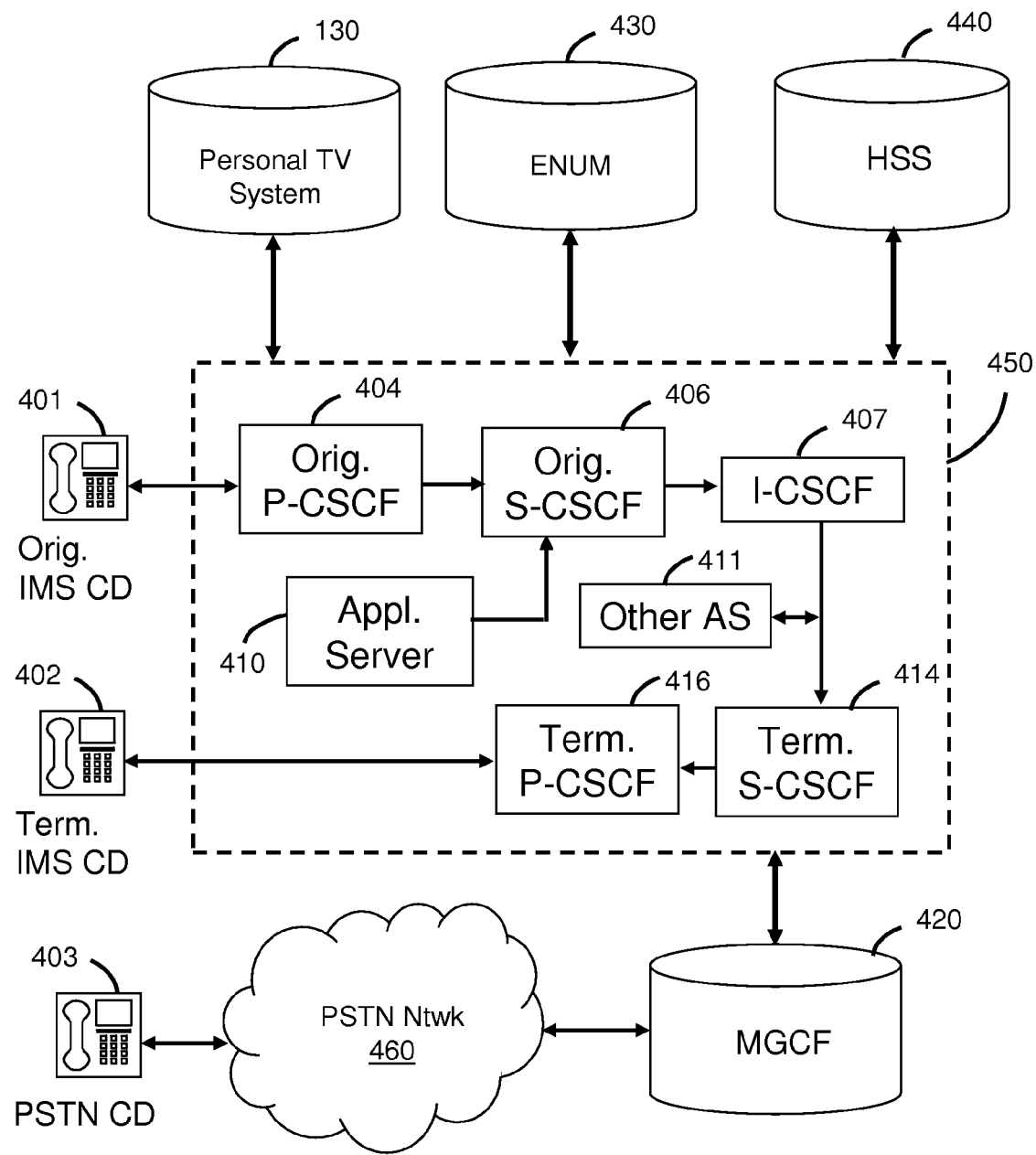

FIG. 4 depicts an exemplary embodiment of a communication system 400 employing a IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) support by the HSS 440. To accomplish a communication session between CDs, an originating IMS CD 401 can submit a SIP INVITE message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E. 164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (not shown).

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the personal TV system 130 previously discussed for FIGS. 1-3. In this representative embodiment, the personal TV system 130 can be accessed over a PSTN or VoIP channel of communication system 400 by common techniques such as described above.

Figure 5:
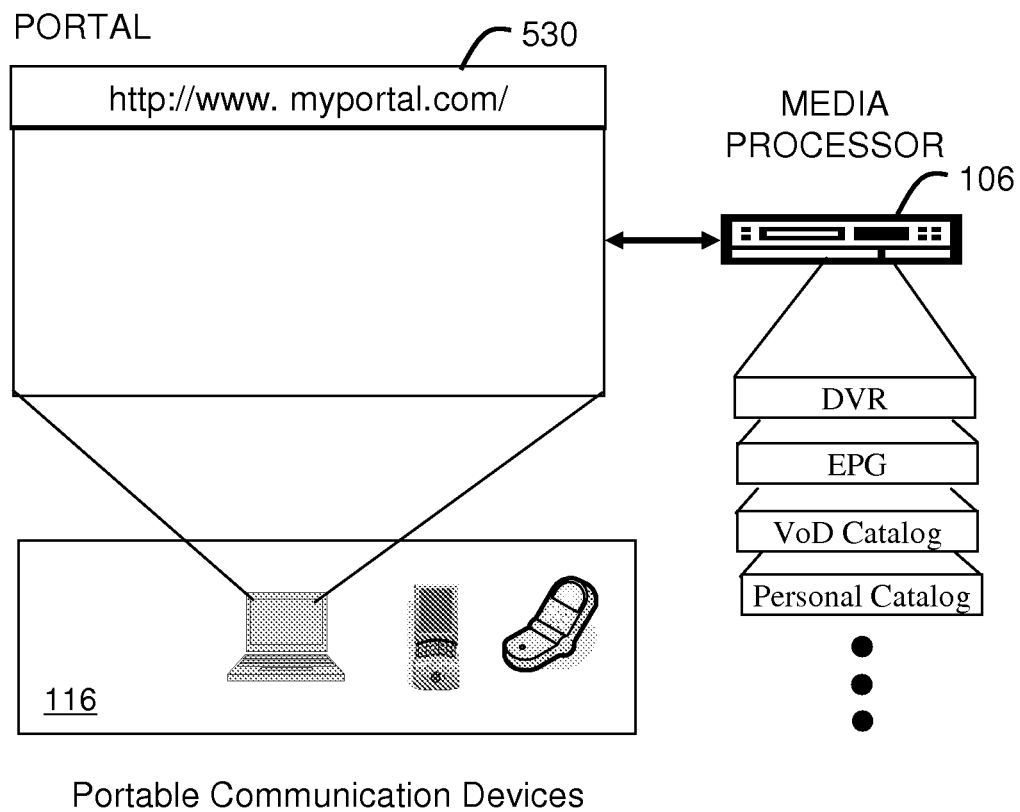
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), personal TV channels, and so on.

A personal TV channel should not be confused with a common broadcast channel sourced by commercial and non-profit enterprises such as NBC (National Broadcasting Company), CBS (Columbia Broadcasting System), ABC (American Broadcasting Channel), PBS (Public Broadcasting System), ESPN (Entertainment and Sports Programming Network), HBO (Home Box Office), Disney Channel, Nickelodeon, and so on. Commercial and non-profit broadcast channels present media content managed in part by media supplier corporations such as, for example, General Electric, Walt Disney Company, and conglomerates such as Time Warner.

Commercial and non-profit media suppliers are generally speaking not subscribers or consumers of the media content presented by the abovementioned media communication systems. Service providers of the abovementioned media communication systems serve as distributors to commercial and non-profit media suppliers and generally present their media content on select channels which are commonly known and memorized by its subscribers because of their frequency of use. Subscribers of the abovementioned media communication systems consume the media content presented on these broadcast channels and are not offered an opportunity to intermix personal content with the content of the commercial and non-profit broadcast media suppliers.

Personal TV channels, on the other hand, provide subscribers of the abovementioned media communication systems a unique opportunity to broadcast media content managed by the subscribers. The source of media content presented by the subscriber can be of any form (e.g., audio, video, still pictures, text, and combinations thereof). The presentation timing of the media content broadcasted by the subscriber in personal TV channels can be determined at the subscriber's discretion. Similarly the subscriber has the discretion to choose any media content the subscriber desires to present in the personal TV channel. Personal TV channels can be selected and consumed by subscribers of the media communication systems as well as others having access to the media communication systems by entering a channel number or other form of identification assigned by the service providers of the media communication systems to each personal TV channel.

Figure 6:
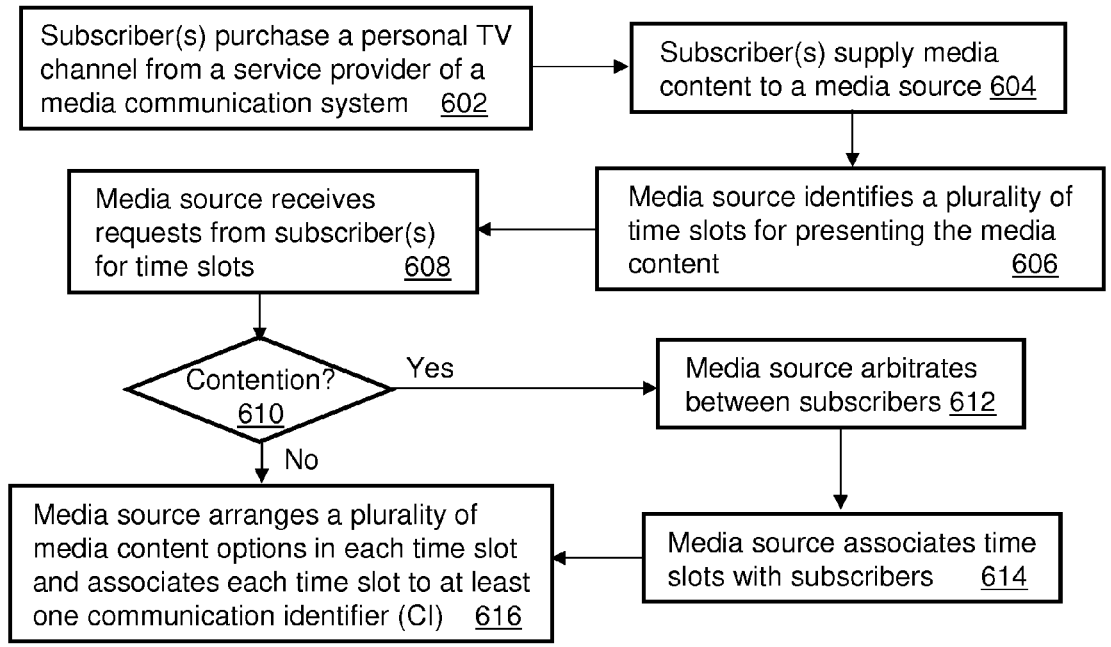
FIG. 6 depicts an exemplary method operating in portions of the communication systems of FIGS. 1-4.
Figure 6:
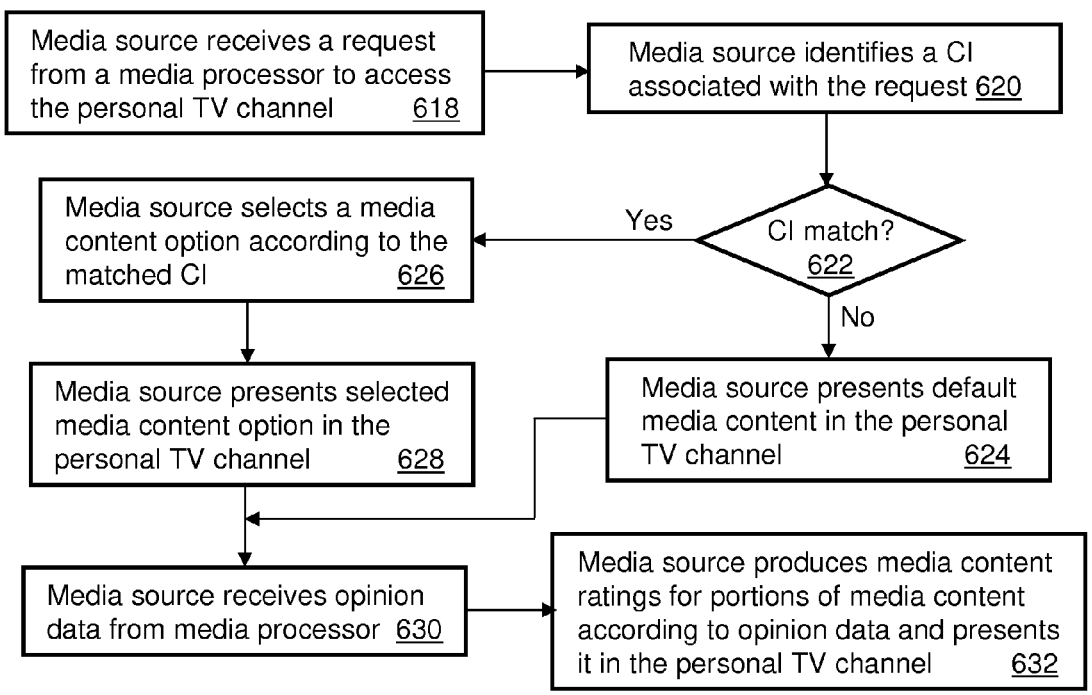

With the aforementioned embodiments in mind, FIG. 6 depicts an exemplary method 600 operating in portions of communication systems 100-400. Method 600 begins with step 602 in which one or more subscribers purchase a personal TV channel from a service provider of a media communication system (such as references 100-300). The term "purchase" in the present context should be interpreted broadly. For instance, a service provider can lease personal TV channels in which a periodic service charge (e.g., monthly, semi-annually, yearly) is due from the subscriber. Leases can be automatically renewed, or can expire and the personal TV channel can be made available to other subscribers. From this illustration, it would be apparent to one of ordinary skill in the art that the term "purchase" can represent any transaction for consideration between the subscriber and the service provider in relation to the acquisition (whether it is a wholly owned interest, a shared interest or otherwise) of a personal TV channel.

For example, a subscriber can purchase a personal TV channel exclusively (24 hours, 7 days a week, 365 days a year). The subscriber can time share the personal TV channel with friends and/or family (e.g., Mom and Dad get time slot 9-10 pm, daughter gets time slot 8-9 pm, and so on). In another illustrative embodiment, the service provider can sell time slots of a single personal TV channel (e.g., subscriber 1 buys a time slot from 7-8 pm daily, subscriber 2 purchase the time slot from 8-9 pm daily, and so on). Additionally, subscribers can purchase time slots for a temporary period (e.g., 7-8 pm daily for a 3 month period). The service provider of the media communication system can also allow subscribers to broker the use of their personal TV channel to other subscribers. It follows from these illustrations that there can be innumerable embodiments applied to the present disclosure for purchasing personal TV channels.

A personal TV channel can be identified by consumers by referring to a unique identifier such as a number, a character string, or a combination thereof. The number can represent a very large range of channel numbers supplied by a service provider (e.g., as high as in the billions for national distribution or trillions for global distribution). With a large range a service provider can sell nearly limitless personal TV channel numbers and in some cases more than one channel per subscriber. For ease of recognition, the channel number can be replaced or aliased by call letters such as a character string, or an alphanumeric string creatively defined by the subscriber. Each subscriber can thus provide a preferred designator for ease of marketing (e.g., Joe.Smith.PTV.CH1, Joe.Smith.PTV.CH2, Sam-Doe.PTV, and so on). Channel numbers can also be represented by static IP addresses, domain names, or other suitable forms of identification.

Once a subscriber has acquired access in whole or in part to a personal TV channel, the subscriber can supply in step 604 personalized media content to a media source that distributes and manages content for the subscriber in the personal TV channel. The media source can represent the personal TV system 130 of communication systems 100-400 or a media processor or STB located in the premises of the subscriber capable of performing in whole or in part the media content distribution and manage functions of the personal TV system.

The media content can represent audio, moving images, still images, and combinations thereof. Audio content can represent personal audio recordings, recordings from known artists, or otherwise. Moving image content can represent video games, personal movies, commercial movies, webcam video, TV programs recorded by a DVR, etc. Still images can be family picture albums, artistic renderings, architectural renderings, as well as other forms of still imagery. The subscriber can combine, edit or redact portions of this content before it is supplied to the media source, or in some instances can provide a live content feed (e.g., live webcam). The content supplied by the subscriber can come from a variety of media devices available to the subscriber (DVR, Camcorder, audio recorder, MP3 player, webcam, etc.).

In step 606, the media source can identify a plurality of time slots for presenting the subscriber's media content. Time slots can be hierarchical. For example one level of time slots can represent months, other time slots can represent days of a week, other time slots hours in a day, and so on. With a hierarchical scheme, the subscriber can direct the media source in step 608 to define programming times for media content (e.g., Jan. 2, 2008, 8-9 pm). The subscriber can also direct the media source to utilize a recurring schedule for the media content (e.g., repeat media content every Wednesday, from 8-9 pm, starting from Jan. 2, 2008, at 8-9 pm, for a period of two weeks).

In addition to the above time slot selection process, a subscriber can assign a plurality of media content options in each time slot. Each media content option can represent a different selection of media content by the subscriber. Before presenting media content on a personal TV channel, the media source can be directed to select between media content options according to a communication identifier of a party requesting access to the personal TV channel. A communication identifier can represent authentication data (such as a user name and/or password, personal identification number or PIN, a session initiation protocol uniform resource identifier or SIP URI, etc.) supplied by the requesting party and/or a device of the requesting party (e.g., a media processor or STB). In another illustrative embodiment the communication identifier can represent an identifier of the requesting device such as for example a static IP address assigned to the device, a media access control (MAC) address of the requesting device, a serial number of the requesting device, and so on.

The subscriber can assign in step 608 each media content option to one or more communication identifiers of corresponding requesting parties. The communication identifiers can be supplied for example from an address book of communication identifiers managed by the subscriber. The address book can be stored at the media source or in another device of the subscriber (e.g., a computer, STB, PDA, etc.).

In situations where there is more than one subscriber sharing a personal TV channel, the media source can be directed in step 610 to monitor contentious requests. For instance, when more than one subscriber requests the same time slot, the media source can be directed to arbitrate in step 612 between subscribers. Arbitration can be an interactive process. For example, each subscriber can be notified with a graphical user interface (GUI) prompt presented at the requesting device (e.g., STB, computer, etc.) indicating that they are requesting the same time slot. The media source can proactively provide alternative options to each subscriber by way of the GUI prompt, and/or request for alternative time slots. In another illustrative embodiment, the media source can be programmed with a subscriber priority list to resolve contentions. That is, if one subscriber has a higher priority than another, the media source can accept the request of the higher priority subscriber and reject the request of others. Other common arbitration techniques can be applied to the present disclosure.

Once there is a resolution between the subscribers, the media source can proceed to step 614 where it associates time slots with subscribers. In step 616 the media source can arrange a plurality of media content options in each time slot with a corresponding one or more communication identifiers as directed by the subscriber in step 608. Steps 602-616 can collectively represent a configuration or provisioning phase performed by the subscriber(s) which can be performed independently of the execution or run-time steps 618-632 which illustrate the personal TV channel in use. This dichotomy is illustrated by the dashed line in FIG. 6.

With this in mind, a media source (e.g., STB or personal TV system 130) managing one or more personal TV channels of one or more corresponding subscribers can be directed in step 618 to process requests for access to personal TV channels of the subscribers. The requests can be initiated by STBs in the same media communication system from which the personal TV channels operate, or from STBs in other networks. In the latter case, service operators of independently operated media communication systems can link their networks together under an intra-service agreement to expand the reach of their respective subscribers. The requests submitted by the requesting devices can each identify the requested personal TV channel according to a variety of channel identification methods as described earlier.

In step 620, the media source can identify a communication identifier associated with each request. In one illustrative embodiment, the media source can submit a request to the requesting device (e.g., an STB) for the communication identifier. The request submitted by the media source can trigger a GUI prompt that the requesting device presents to its user. The GUI prompt can be a form with fields for a user name and password, PIN, or otherwise, which the user of the requesting device can complete. In another illustrative embodiment the requesting device can proactively submit the communication identifier to the media source. In yet another illustrative embodiment the communication identifier can be the combination of authentication data and identifying information of the requesting device (e.g., its MAC address).

Once the media source identifies the communication identifier in step 620, it proceeds to step 622 where it compares it to the communication identifiers assigned to each media content option for the time slot active at the time the request was made. If no match is found, the media source can default to a media content option for unrecognized communication identifiers and present in step 624 media content associated with this option in the personal TV channel. If a match is found, the media source proceeds to step 626 where it selects the media content option associated with the matched communication identifier and presents in step 628 content corresponding to said option in the personal TV channel.

To illustrate these embodiments, suppose that a subscriber of a personal TV channel has configured a time slot from 8-9 pm with three possible media content options: 1) vacation movies, 2) audio recordings of the subscriber, and 3) an MP3 play list of songs from the subscriber's music library. Further assume that the subscriber associates vacation movies with communication identifiers of the subscriber's parents and siblings, audio recordings with the communication identifiers of friends, and the MP3 play list with unidentified communication identifiers. Suppose further that the subscriber's parents, friends and unrecognized parties request access to the subscriber's personal TV channel at the same time.

Under these circumstances the requesting devices (e.g., STBs) of the subscriber's parents and siblings will receive in step 628 multicast signals from the media source for viewing streamed vacation movies of the subscriber in the personal TV channel. The requesting devices of the subscriber's friends will contemporaneously receive in step 628 a different set of multicast signals from the media source for listening to streamed audio recordings of the subscriber on the personal TV channel. Lastly, all other parties who submit unrecognized communication identifiers will receive at their requesting devices in step 624 another set of multicast signals corresponding to streamed MP3 music of the subscriber.

In another illustrative embodiment, the media source in step 630 can receive and process opinion data supplied by the requesting devices as directed by its users. The opinion data can be generated by consumers of media content presented in the personal TV channel proactively or on demand. Consumers can prompt or be prompted by their respective media processors to complete a survey about the media content they have experienced in the personal TV channel. The prompt can be programmed into the media processor as a standard opinion survey form that can be completed by the consumer and submitted to the subscriber of the personal TV channel. The subscriber of the personal TV channel can produce its own survey form which it can submit to consumers along with the media content presented in the personal TV channel. In yet another illustrative embodiment, the service provider of the media communication system can provide its own survey to consumers to standardize the opinion data collected.

The media source can be directed in step 632 to produce media content ratings according to the opinion data supplied. In subsequent presentations of the media content, a media content rating can be supplied as metadata in the personal TV channel which can be processed by requesting devices. The requesting devices can be programmed by its users to apply parental controls to limit access to the media content according to its rating. The rating system used can be standardized ubiquitously by the service provider of the media communication system by defining standard criteria for the survey with some flexibility for the subscribers of the personal TV channels to add their own criteria.

Upon reviewing the aforementioned embodiments, it would be evident to an artisan with ordinary skill in the art that said embodiments can be modified, reduced, or enhanced without departing from the scope and spirit of the claims described below. For example, method 600 can be adapted to present personal TV channels on a peer to peer basis. For example, a media content option can represent a library of selectable media content any type-anecdotally similar to a video on demand library. Although the media content options can be automatically selected according to the communication identifier of the requesting device, the consumer of the requesting device is presented a library or catalog of media content of the subscriber that can be selected on demand.

Once an item is selected from the subscriber's media content library, the media source present it in the personal TV channel. Since selections can be asynchronous between requesting parties (e.g., party A requests the same media content as party B five minutes prior), the transmission of these selections is performed with unicast signals (i.e., peer-to-peer communications over the media communication system).

Other suitable modifications can be applied to the present disclosure without departing from the scope of the claims below. Accordingly, the reader is directed to the claims section for a fuller understanding of the breadth and scope of the present disclosure.

Figure 7:
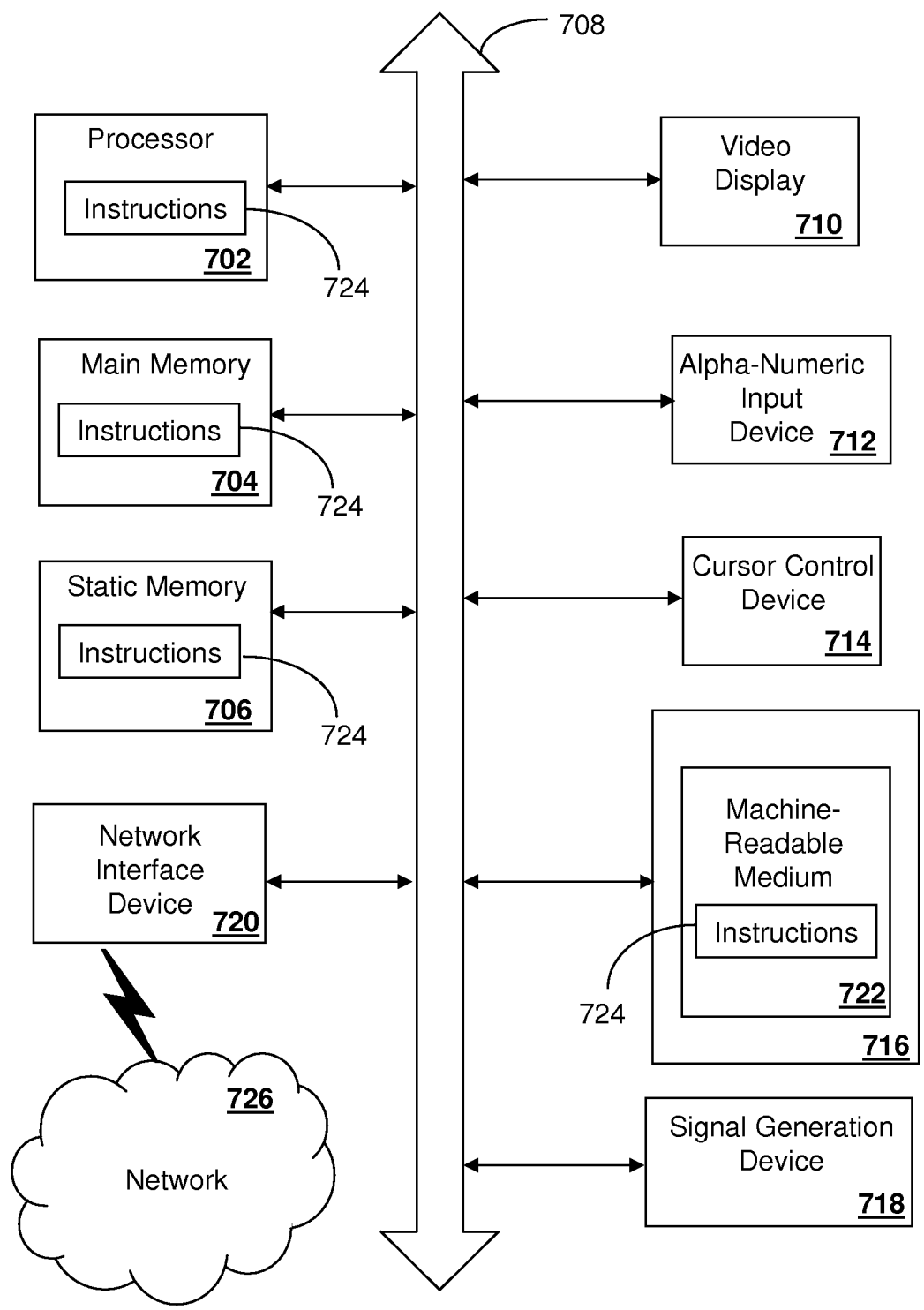
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; Accordingly, the disclosure is considered to include any one or more of a machine-readable medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage device, comprising computer instructions which, responsive to being executed by a processor, cause the processor to perform operations comprising:

arranging a plurality of media content items for presentation via a personal television channel into a plurality of media content groupings, wherein each of the plurality of media content groupings is associated with one of a plurality of communication identifiers of a plurality of requesting devices, wherein at least two of the plurality of requesting devices are associated with different media content groupings, and wherein the plurality of requesting devices share access to the personal television channel for presentation of one of the plurality of media content groupings associated therewith;

arranging the plurality of media content groupings for display during one or more time slots, each of the one or more time slots being assigned a plurality of media content options according to the plurality of communication identifiers;

receiving a first group of requests from a first group of requesting devices of the plurality of requesting devices for access to the personal television channel;

identifying a first group of communication identifiers of the plurality of communication identifiers, the first group of communication identifiers associated with the first group of requests;

detecting a first group of matches between the first group of communication identifiers and the plurality of communication identifiers to detect a first matched group of communication identifiers;

selecting a first media content grouping of the plurality of media content groupings corresponding to the first matched group of communication identifiers;

receiving a second group of requests from a second group of requesting devices of the plurality of requesting devices for access to the personal television channel;

identifying a second group of communication identifiers of the plurality of communication identifiers, the second group of communication identifiers associated with the second group of requests;

detecting a second group of matches between the second group of communication identifiers and the plurality of communication identifiers to detect a second matched group of communication identifiers;

selecting a second media content grouping of the plurality of media content groupings corresponding to the second matched group of communication identifiers; and presenting the first media content grouping in the personal television channel for presentation at the first group of requesting devices by transmitting to the first group of requesting devices a first group of multicast signals comprising the first media content grouping while presenting the second media content grouping in the personal television channel for presentation at the second group of requesting devices by transmitting to the second group of requesting devices a second group of multicast signals comprising the second media content grouping, wherein the first group of multicast signals differs from the second group of multicast signals.

2. The computer-readable storage device of claim 1, wherein the first group of communication identifiers and the second group of communication identifiers are received from the first group of requesting devices and the second group of requesting devices responsive to submit the first group of communication identifiers and the second group of communication identifiers.

3. The computer-readable storage device of claim 1, wherein the plurality of communication identifiers comprises authentication data; or an identifier of the requesting device.

4. The computer-readable storage device of claim 3, wherein the authentication data comprises identification data of a subscriber and wherein each communication identifier of the plurality of communication identifiers comprises one of a static Internet Protocol address, a media access control address or a serial number.

5. The computer-readable storage device of claim 1, wherein one of the plurality of requesting devices comprises a media processor.

6. The computer-readable storage device of claim 5, wherein the media processor comprises a set-top box.

7. The computer-readable storage device of claim 1, wherein the plurality of media content groupings comprises one of audio content, moving image content, or still image content.

8. The computer-readable storage device of claim 1, wherein the operations further comprise:

receiving opinion data from each of the plurality of requesting devices consuming portions of the plurality of media content groupings presented in the personal television channel;

producing media content ratings for the plurality of media content groupings according to the opinion data; and presenting in the personal television channel the media content ratings.

9. The computer-readable storage device of claim 8, wherein the media content ratings are presented as metadata, and wherein the metadata is utilized by a device consuming media content supplied in the personal television channel to trigger parental controls that limit consumption of a portion of said media content.

10. The computer-readable storage device of claim 1, wherein the plurality of communication identifiers are stored in an address book, and wherein the personal television channel is identified according to a character string, a number, and an alphanumeric string.

11. The computer-readable storage device of claim 1, wherein the personal television channel is shared by a plurality of subscribers supplying portions of the plurality of media content items, and wherein the operations further comprise:

identifying a plurality of time slots for presenting the plurality of media content groupings in the personal television channel;

associating a select one of the time slots with a select one of the plurality of communication identifiers; and arranging the plurality of media content groupings according to the associations.

12. The computer-readable storage device of claim 11, wherein the time slots are statically assigned.

13. The computer-readable storage device of claim 11, wherein the time slots are dynamically assigned.

14. The computer-readable storage device of claim 1, wherein the computer-readable storage medium is used in one of a set-top box or a network element of a media communication system, and wherein the media communication system comprises one of an internet protocol television communication system, a cable television communication system, a satellite television communication system, a public switched telephone network, a voice over internet protocol communication system, or a internet protocol multimedia subsystem combining the public switched telephone network and voice over internet protocol communication systems.

15. A method, comprising:

arranging a plurality of media content items for presentation via a personal television channel into a plurality of media content groupings each associated with one of a plurality of communication identifiers of a plurality of requesting devices;

arranging the plurality of media content groupings in one or more time slots, each of the one or more time slots comprising a plurality of media content options assigned to the plurality of communication identifiers;

receiving a first group of requests from a first group of requesting devices of the plurality of requesting devices for access to the personal television channel;

identifying a first group of communication identifiers associated with the first group of requests;

detecting a first group of matches between the first group of communication identifiers and the plurality of communication identifiers to detect a first matched group of communication identifiers;
selecting a first media content grouping of the plurality of media content groupings corresponding to the first matched group of communication identifiers;
receiving a second group of requests from a second group of requesting devices of the plurality of requesting devices for access to the personal television channel;
identifying a second group of communication identifiers associated with the second group of requests;
detecting a second group of matches between the second group of communication identifiers and the plurality of communication identifiers to detect a second matched group of communication identifiers;
selecting a second media content grouping of the plurality of media content groupings corresponding to the second matched group of communication identifiers;
transmitting to the first group of requesting devices a first group of multicast signals comprising the first media content grouping for presenting the first media content grouping in the personal television channel; and
transmitting to the second group of requesting devices a second group of multicast signals comprising the second media content grouping for presenting the second media content grouping in the personal television channel, wherein the first group of multicast signals differ from the second group of multicast signals.

16. The method of claim 15, wherein the first and second group of communication identifiers are received from the first and second group of requesting devices responsive to directing the first and second group of requesting devices to submit the first and second group of communication identifiers.

17. A server, comprising:
a memory to store instructions; and
a processor coupled to the memory, wherein executing the instructions causes the processor to perform operations comprising:
arranging a plurality of media content groupings in one or more time slots, each of the one or more time slots comprising a plurality of media content options assigned to a plurality of communication identifiers;
receiving a first group of requests from a first group of requesting devices for access to a personal television channel;
identifying a first group of communication identifiers associated with the first group of requests;
detecting a first group of matches between the first group of communication identifiers and the plurality of communication identifiers to detect a first matched group of communication identifiers;
selecting a first media content grouping of the plurality of media content groupings corresponding to the first matched group of communication identifiers;
receiving a second group of requests from a second group of requesting devices for access to the personal television channel;
identifying a second group of communication identifiers associated with the second group of requests;
detecting a second group of matches between the second group of communication identifiers and the plurality of communication identifiers to detect a second matched group of communication identifiers;
selecting a second media content grouping of the plurality of media content groupings corresponding to the second matched group of communication identifiers;
transmitting to the first group of requesting devices a first group of multicast signals comprising the first media content grouping for presenting the first media content grouping in the personal television channel; and
transmitting to the second group of requesting devices a second group of multicast signals comprising the second media content grouping for presenting the second media content grouping in the personal television channel, wherein the first group of multicast signals differ from the second group of multicast signals.

18. The server of claim 17, wherein the operations further comprise:
receiving opinion data from each of the plurality of requesting devices consuming portions of the plurality of media content groupings presented in the personal television channel;
producing media content ratings for the plurality of media content groupings according to the opinion data; and
presenting in the personal television channel the media content ratings.

19. The server of claim 17, wherein the plurality of communication identifiers are stored in an address book, and wherein the personal television channel is identified according to of a character string, a number, and an alphanumeric string.

* * * * *